US012002619B2

(12) United States Patent
Sørensen et al.

(10) Patent No.: US 12,002,619 B2
(45) Date of Patent: Jun. 4, 2024

(54) PERMANENT MAGNET BASED MAGNETISER

(71) Applicant: GRUNDFOS HOLDING A/S, Bjerringbro (DK)

(72) Inventors: Allan Ivo Søgaard Sørensen, Hobro (DK); Henrik Rasmussen, Rødkaersbro (DK); Alexandru Sorea, Aalborg Øst (DK); Bendixen Buus Fleming, Hobro (DK)

(73) Assignee: Grundfos Holding A/S, Bjerringbro (DK)

( * ) Notice: Subject to any disclaimer, the term of this patent is extended or adjusted under 35 U.S.C. 154(b) by 210 days.

(21) Appl. No.: 17/763,874

(22) PCT Filed: Sep. 25, 2020

(86) PCT No.: PCT/EP2020/076973

§ 371 (c)(1),
(2) Date: Mar. 25, 2022

(87) PCT Pub. No.: WO2021/058779

PCT Pub. Date: Apr. 1, 2021

(65) Prior Publication Data

US 2022/0336135 A1 Oct. 20, 2022

(30) Foreign Application Priority Data

Sep. 25, 2019 (EP) .................................... 19199709

(51) Int. Cl.
*H01F 7/02* (2006.01)
*H01F 13/00* (2006.01)

(52) U.S. Cl.
CPC ......... *H01F 7/0278* (2013.01); *H01F 13/003* (2013.01)

(58) Field of Classification Search
CPC ...... H01F 13/003; H01F 7/0278; H01F 7/021; H01F 7/0273
See application file for complete search history.

(56) References Cited

U.S. PATENT DOCUMENTS 3,662,303 A 5/1972 Arllof
6,225,887 B1 * 5/2001 Jensen .................. H01F 7/0278 335/301

(Continued)

FOREIGN PATENT DOCUMENTS

CN 102412051 4/2012
CN 103971878 8/2016

(Continued)

*Primary Examiner* — Mohamad A Musleh
(74) *Attorney, Agent, or Firm* — DeWitt LLP; Brian R. Pollack, Esq.

(57) ABSTRACT

A magnetizer including a housing, a passage arranged inside the housing, and a permanent magnet assembly arranged outside the passage to provide a magnetic field passing through the passage. The housing defines an inlet to the passage and an outlet from the passage such that an object to be magnetised can be inserted into the passage via the inlet in the housing and removed via the outlet in the housing. The passage includes a uniform portion where opposing surfaces of the permanent magnet assembly are arranged a uniform distance apart along the length of the uniform portion and a diverging portion arranged between one end of the uniform portion of the passage and the outlet of the housing.

16 Claims, 5 Drawing Sheets

(56) References Cited

U.S. PATENT DOCUMENTS

| | | | | |
|---|---|---|---|---|
| 8,358,190 | B1 * | 1/2013 | Hoff | H05B 6/66 335/306 |
| 2013/0192723 | A1 | 8/2013 | Komura et al. | |

FOREIGN PATENT DOCUMENTS

| | | | | | |
|---|---|---|---|---|---|
| CN | 107004490 | | | 8/2017 | |
| JP | S6312110 | A | * | 1/1988 | |
| JP | 2002151298 | | | 5/2002 | |
| WO | WO-2011023910 | A1 | * | 3/2011 | G01R 33/307 |

* cited by examiner

PERMANENT MAGNET BASED MAGNETISER

The current invention relates to a magnetiser comprising a housing, a passage arranged inside the housing, and a permanent magnet assembly arranged outside the passage to provide a magnetic field passing through the passage, said housing comprising an inlet to the passage and an outlet from the passage such that an object to be magnetised can be inserted into the passage via the inlet and removed via the outlet.

DESCRIPTION OF RELATED ART

A magnetiser as described above is used to magnetise magnetisable objects. One simple example of the use of such a magnetiser is to magnetise the tip of a screwdriver. In the case of a magnetiser for a screwdriver, the magnetiser is a simple device having a housing with an opening into a passage and a permanent magnet arranged to provide a magnetic field through the passage. A user then inserts the screwdriver tip into the opening to place the screwdriver tip inside the passage. The magnetic field in the magnetiser then magnetises the screwdriver tip. Once the tip is magnetised, the screwdriver tip is removed from the passage. In this case, the inlet and the outlet are the same as the screw driver is inserted into and removed from the passage via the same opening in the housing.

While the above description illustrates one simple use of a magnetiser, there are many different applications of magnetisers. In the case of a screwdriver, the actual magnetic properties of the screwdriver are not so important. However, in other applications, for example in a situation where a magnetic component is a component in a position sensor assembly, it is necessary to magnetise the object very precisely. In this case, the magnetic field of the magnetiser has to be very precise. It is well known that permanent magnet based magnetisers as mentioned in the opening paragraph are not very precise and there are many undesired magnetic effects which can affect the magnetic field in the magnetised object.

In cases where more precise magnetic fields are needed, electric magnets based on coils are currently used instead. In this case, a very precise magnetic field can be designed by carefully manufacturing electric coils. Furthermore, the object to be magnetised can be first inserted into a passage in the electric magnet based magnetiser while the electric current is not applied. Electric current is first supplied to the coil of the electric magnet to create the magnetic field after the object to be magnetised has been inserted in the passage. When the element to be magnetised is properly magnetised, the current is stopped and the field is removed. Then the object can be removed from the passage of the magnetiser. In this way, any undesired magnetic fields around the entrance and exit of the magnetiser can be avoided and the object is magnetised with a very precise magnetic field.

While electric coil based magnetisers provide a very well defined and precise magnetic field in the magnetised objects, electric magnets are expensive to use and consume a significant amount of power. In production processes where many objects need to be magnetised, or in processes where multiple objects need to be magnetised simultaneously, multiple electric coil based magnets need to be provided which can be expensive, complicated, consume great amounts of power and generate a lot of heat that needs to be removed. Furthermore, the high currents required in electromagnets can be dangerous for operators.

SUMMARY OF THE INVENTION

It is therefore a first aspect of the current invention to provide a permanent magnet based magnetiser as mentioned in the opening paragraph which reduces the undesired magnetic field effects in the magnetised object.

This object is provided at least in part by a magnetiser as mentioned in the opening paragraph, where the passage comprises a uniform portion where opposing surfaces of the permanent magnet assembly are arranged a uniform distance apart along the length of the uniform portion and a diverging portion arranged between one end of the uniform portion of the passage and the outlet of the housing where opposing surfaces of the permanent magnet assembly diverge such that the distance between opposing surfaces of the diverging portion nearest the uniform portion is less than the distance between opposing surfaces of the diverging portion nearest the outlet and where the average angle (B) of the normal vector of the opposing surfaces of the diverging portion to a longitudinal centre axis of the passage is greater than 45 degrees.

For the sake of this specification, the term “opposing surfaces” should be understood as surfaces, or portions of surfaces, which are arranged on opposite sides of a plane passing through the longitudinal centre axis of the passage. For example, in a case where the passage comprises two opposing walls, then the opposing surfaces are the two opposing walls. However, in a case where the passage has a more circular cross section or another form of cross section without linear portions, then the opposing surfaces should be interpreted as opposing portions of the inner cylindrical surface of the passage. In one embodiment, the distance between the opposing surfaces is constant and/or fixed.

In one embodiment, the average angle of the normal vector of the opposing surfaces of the diverging portion to the longitudinal centre axis of the passage is greater than 55 degrees or greater than 65 degrees. In one embodiment, the passage can be arranged such that the uniform portion transitions smoothly into the diverging portion.

In one embodiment, the average tangent vector to the surface of the diverging portion on a plane passing through the longitudinal centre axis of the passage is less than 45 degrees, less than 35 degrees or less than 25 degrees.

In one embodiment, the distance between opposing surfaces of the diverging portion nearest to the uniform portion is the same as the distance between opposing surfaces of the uniform portion of the passage. In one embodiment, the magnetic field lines generated by the permanent magnet assembly at the longitudinal centre of the uniform portion are essentially perpendicular to the longitudinal centre axis of the passage.

In one embodiment, the permanent magnet assembly comprises a permanent magnet arranged outside the passage and an insert arranged between the permanent magnet and the passage, said insert being made of a material having a relative magnetic permeability greater than 1. In one embodiment, the insert is exchangeable.

In one embodiment, the length of the permanent magnet along the longitudinal axis of the passage is the same or greater than the length of the insert along the longitudinal axis of the passage. In one embodiment, the magnetic field lines generated by the permanent magnet are conducted to the passage via the insert.

In one embodiment, the distance D4 between opposing surfaces of the diverging portion nearest the outlet is at least 1.2 times greater than the distance D3 between the opposing surfaces of the uniform portion. In one embodiment, the distance D4 is at least 1.3 times greater, at least 1.4 times greater, at least 1.5 times greater or at least 1.7 times greater than D3.

In one embodiment, the length D1 of the uniform portion is at least 10 mm. In one embodiment, the distance D3 is at least 5 mm, at least 6 mm, at least 7 mm or at least 8 mm. In one embodiment, the dimension D1 is greater than D3. In one embodiment, the dimension D5 of the width of the permanent magnet assembly is at least twice, at least three times or at least four times greater than D3.

In one embodiment, the length D2 of the diverging portion in a direction parallel to the longitudinal centre axis of the passage is greater than 0.5 times the distance D3 between the opposing surfaces of the uniform portion. In one embodiment, the length D2 is 0.6 times, 0.7 times, 0.8 times or 0.9 times greater than D3.

In one embodiment, the inlet and the outlet in the housing are the same opening, such that the object to be magnetised is introduced into and removed from the passage via the same opening in the housing. In an alternative embodiment, the inlet and the outlet in the housing are two different openings in the housing such that the object to be magnetised enters the passage via the inlet and leaves the passage via the outlet.

In one embodiment, the permanent magnet assembly comprises a circular array of magnets arranged around the periphery of the passage. In one embodiment, the permanent magnet assembly comprises an array of magnets arranged as a Halbach array. In one embodiment, the Halbach array is arranged as a circular Halbach array where the individual magnets of the Halbach array are arranged to provide a multi pole magnetic field passing through the uniform portion essentially perpendicular to the longitudinal centre axis of the passage.

In one embodiment, the circular array of magnets comprises at least one permanent magnet that has a non-rectangular shape. In one embodiment, the least one permanent magnet has a shape with at least one curved surface. In one embodiment, the at least one permanent magnet has a shape with at least one concave curved surface. In one embodiment, the curved surface is cut into the magnet via a wire based cutter which is moved along a curved path.

In one embodiment, the permanent magnet assembly is arranged to provide at least a two-pole magnetic field in the uniform portion of the passage. In one embodiment, the permanent magnet assembly is arranged to provide at least a four-pole, at least a six-pole, or at least an eight-pole magnetic field in the uniform portion of the passage.

The invention also relates to a magnetising mechanism comprising a magnetiser as described herein and an actuator, said actuator being arranged to repeatedly move the magnetiser from a first position to a second position, said first position being arranged such that the passage is located away from an object to be magnetised and said second position being arranged such that the uniform portion of the passage of the magnetiser is arranged around the object to be magnetised. In one embodiment, a magnetising mechanism is provided comprising a magnetiser as described herein and an actuator, said actuator being arranged to grip an object to be magnetised, move the object into the uniform portion of the passage in the magnetiser, remove the object from the passage in the magnetiser and release the object.

In one embodiment, the magnetising mechanism comprises a centring mechanism, said centring mechanism being arranged to centre an object to be magnetised with respect to the magnetiser, when said object is inserted into the magnetiser. In one embodiment, said centring mechanism comprises an exchangeable guide element or insert which is removably inserted into the magnetiser, said exchangeable guide element being designed to contact the object to be magnetised and guide it into a centred position.

It should be emphasized that the term "comprises/comprising/comprised of" when used in this specification is taken to specify the presence of stated features, integers, steps or components but does not preclude the presence or addition of one or more other features, integers, steps, components or groups thereof.

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

FIGS. 1 to 6 shows different views and charts related to a first embodiment 1 of a permanent magnet based magnetiser according to the current invention.

Figure 3:
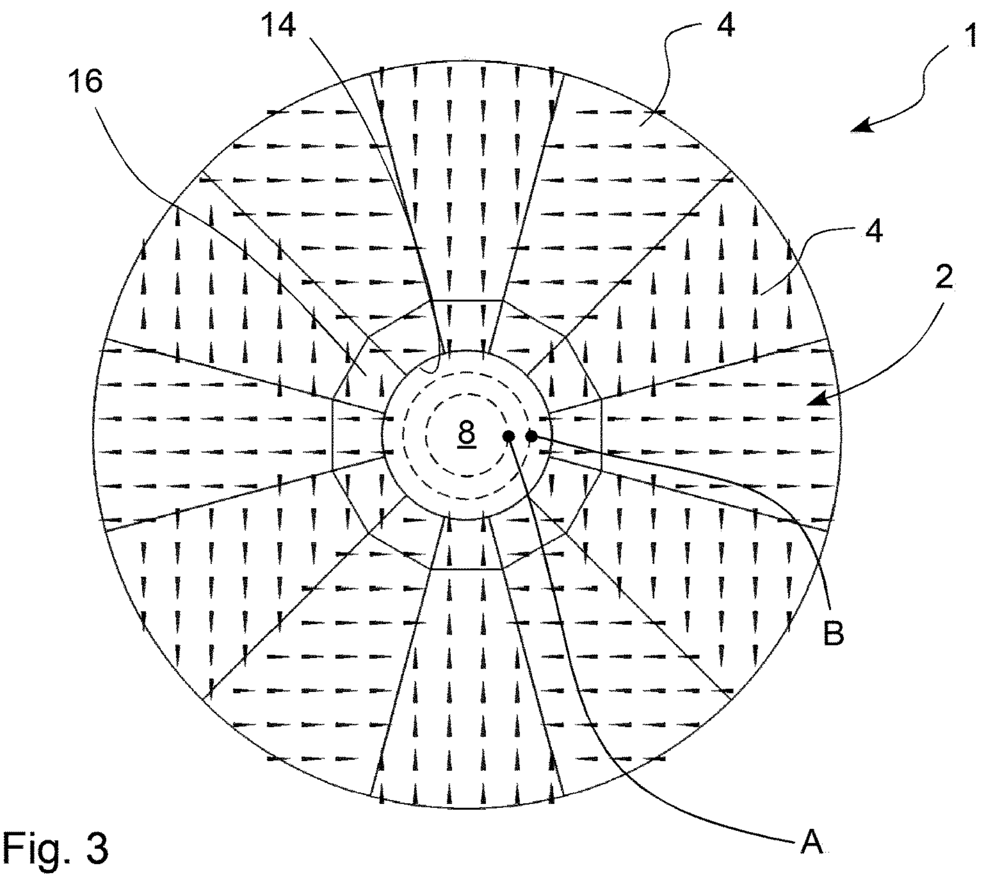
FIG. 3 schematically shows the arrangement of the magnets of the magnetiser of FIG. 1, showing the magnetising direction of the individual magnets.
Figure 4:
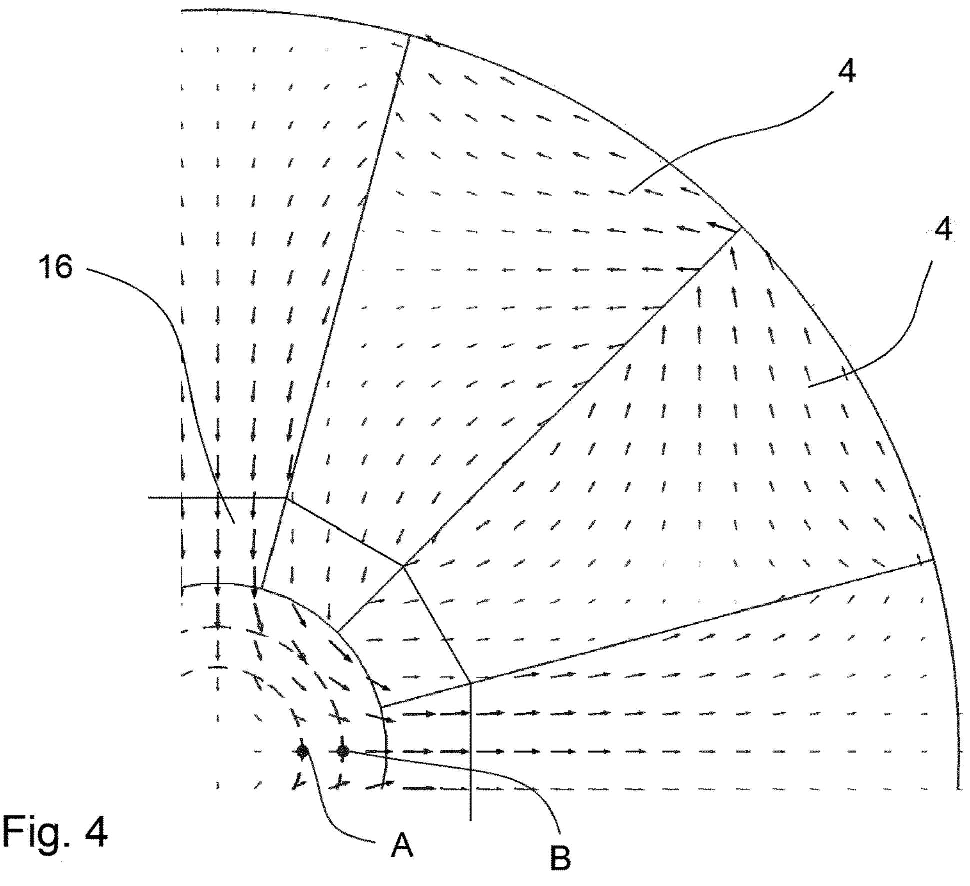
FIG. 4 schematically shows the resulting magnetic field of the magnetiser of FIG. 1.

The magnetiser 1 comprises a circular array 2 of shaped permanent magnets 4. Each of said permanent magnets having a roughly pie shaped cross section, which when arranged in a circular array form a Halbach array. The magnetizations of the individual magnets is shown in FIG. 3 and a partial view of the resulting magnetic field of the overall assembly is shown in FIG. 4. As can be seen from FIG. 4, the resulting assembly provides a magnetiser having a magnetic field with four poles. As will be known to the person skilled in the art, by changing the number of magnets and changing the magnetisations of the different magnets, the resulting magnetic field and the number of poles can be changed.

The magnetiser has an outer body made of permanent magnets 4 and a passage 8 passing through the magnets. The passage 8 has a longitudinal centre axis L. In this embodiment, the passage has an upper opening 10 and a lower opening 12. The function of the openings can be different depending on how the magnetiser is used. In the case of the magnetiser shown in FIGS. 1 to 6, an object to be magnetised is typically inserted into the upper opening 10 and removed again from the upper opening 10. In this case, the upper opening 10 functions as both an inlet into and an outlet from the passage. In another situation, one could imagine that an object is inserted into the passage via the lower opening 12 and removed from the passage via the upper opening 10.

The passage 8 in the current embodiment comprises two portions: a uniform portion 14 and a diverging portion 16. In the uniform portion, the magnets 4 are shaped such that the opposing surfaces of the magnets are arranged parallel to each other such that the distance between the opposing surfaces of the uniform portion are constant along the length D1 of the uniform portion. In this embodiment, since the magnetiser is arranged as a circular array of magnets, it should be understood that the opposing surfaces as discussed here are all part of the same cylindrical surface, however for the sake of this specification, opposing portions of the cylindrical surface should be understood as opposing surfaces.

Near the outlet 10 of the passage, the magnets 4 are shaped to form a diverging portion 16. The diverging portion is arranged so that as the object leaves the passageway via the outlet, the opposing surfaces 16 of the magnets diverge away from each other. Different dimensions are shown on FIG. 2 to better describe the dimensions of the magnetiser. The length of the uniform portion along the longitudinal centre axis is shown by the dimension D1. The length of the diverging portion along a distance parallel to the longitudinal centre axis of the passage is shown by D2. The distance between the opposing surfaces of the uniform portion is shown by D3 and the maximum distance between the opposing surfaces of the diverging portion is shown by D4. The outer diameter of the circular array of magnets is shown by D5. The angle that the tangent vector to the opposing surfaces of the diverging portion makes to the longitudinal axis is shown by the angle A. The normal vector to the surface in the diverging portion is shown by the vector N. The angle of the normal vector to the longitudinal axis is shown by the angle B in FIG. 1 and is 90 degrees minus the angle A.

In one concrete case D1 is 31.2 mm, D2 is 8.8 mm, D3 is 10 mm, D4 is 15.84 mm, D5 is 44 mm and the angle A is 20 degrees (or the angle of the normal vector to the longitudinal centre axis is 70 degrees).

The magnetiser 1 is arranged with a housing (not shown) arranged around the permanent magnets 4 to hold the magnets in place and protect them from damage. In one embodiment (not shown), the housing is made from aluminium. However, in other embodiments, the housing could be made from soft-magnetic material or non-magnetic material.

Figure 1:
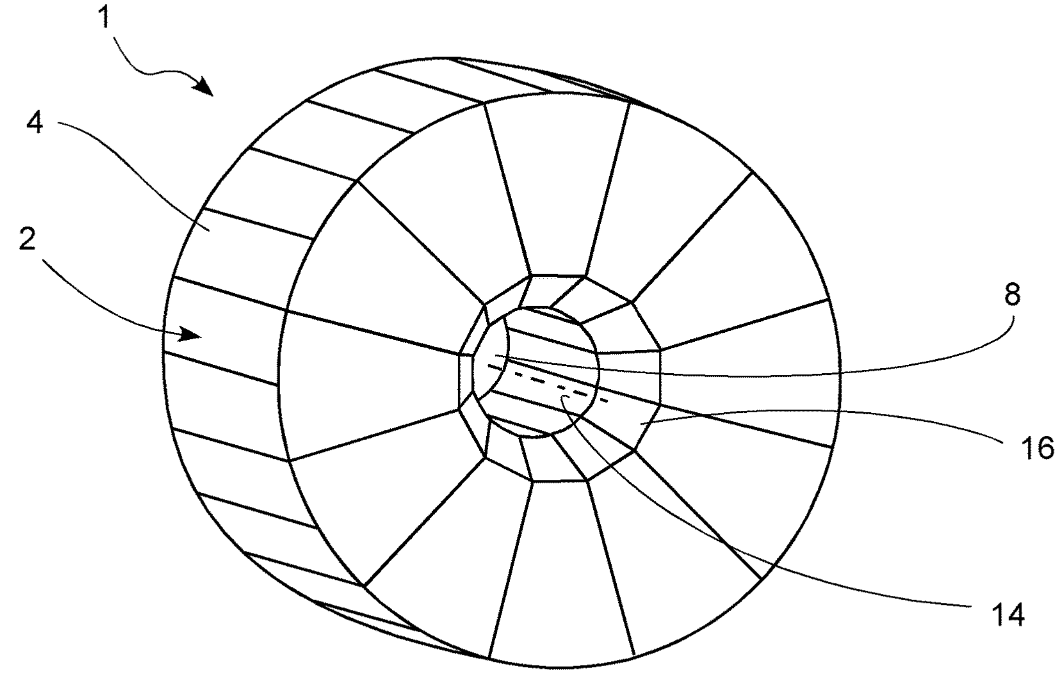
FIG. 1 shows a perspective view of a first embodiment of a magnetiser according to the current invention.
Figure 2:
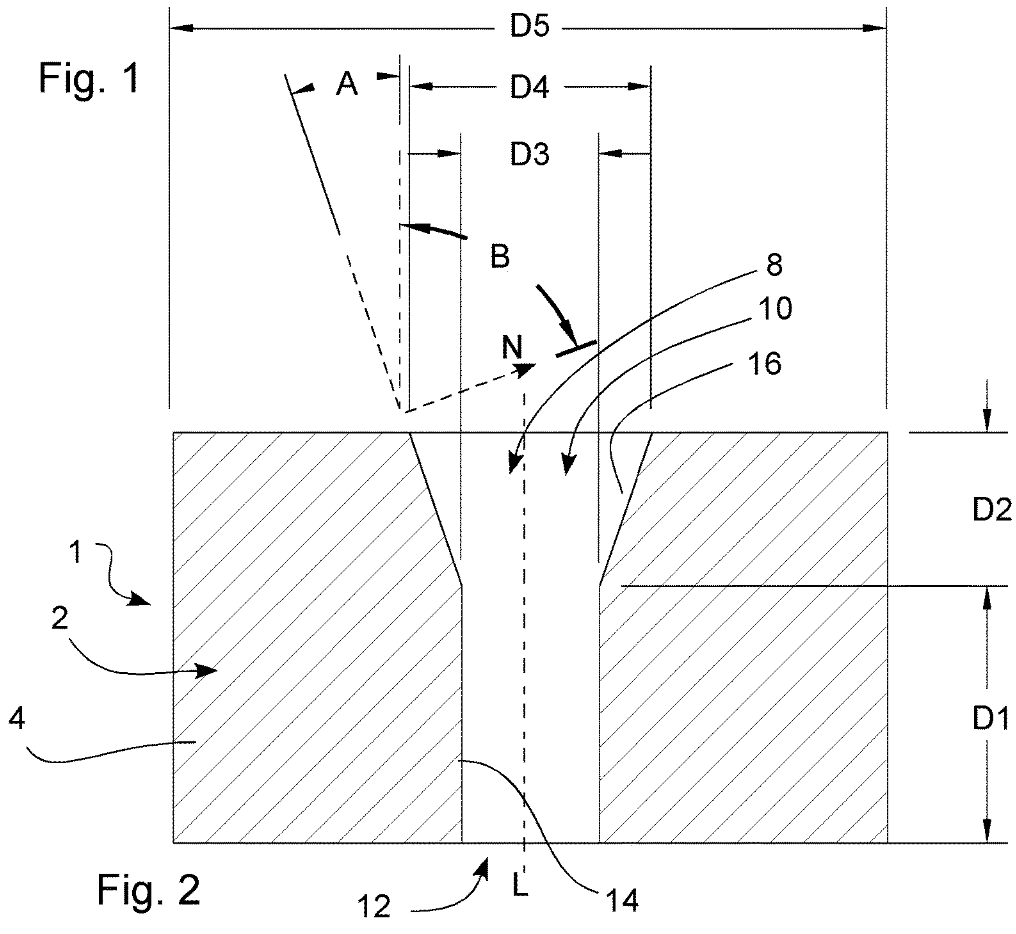
FIG. 2 shows a schematic cross section view of the magnetiser of FIG. 1.

In FIG. 1, it can be seen that the magnets are provided with flat surfaces. In one embodiment, the surfaces could be cut with curved surfaces to provide a more circular central passage and a more circular diverging portion. In such a case, the curved surfaces could be cut via a wire cutting machine, for example wire-cut EDM, which is moved along a curved path.

Figure 5:
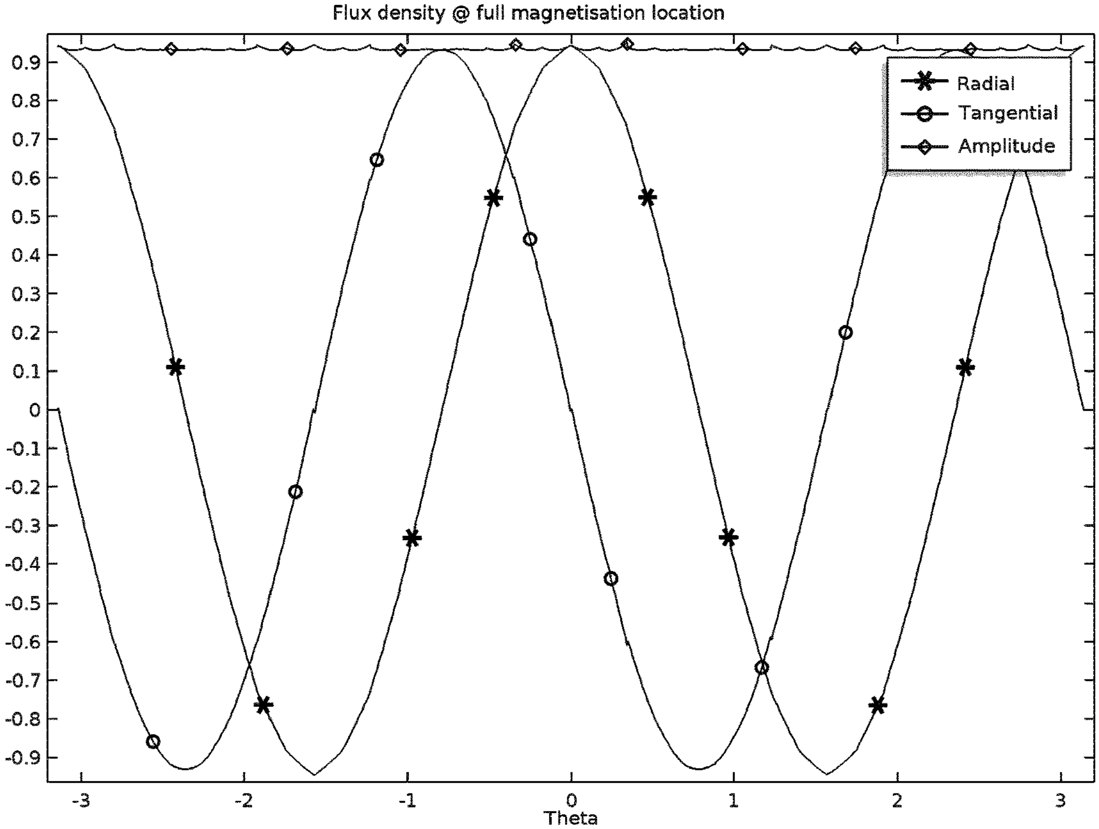
FIG. 5 shows the flux density of the magnetic field inside the passage of the magnetiser of FIG. 1 around the circle defined by A in FIGS. 3 and 4.

FIG. 5 shows the properties of the magnetic field inside the uniform portion of the passage 8. The figure shows the radial (B rad) and tangential (B tan) component of the magnetic flux at different angular positions travelling around the circumference of the passageway at a distance of 2.5 mm from the central axis of the passage. This is shown by the dashed circle comprising the point A as shown in FIGS. 3 and 4. As can be seen, the magnetic field has a very sinusoidal property which provides for a nice magnetic field in the magnetised object.

Figure 6:
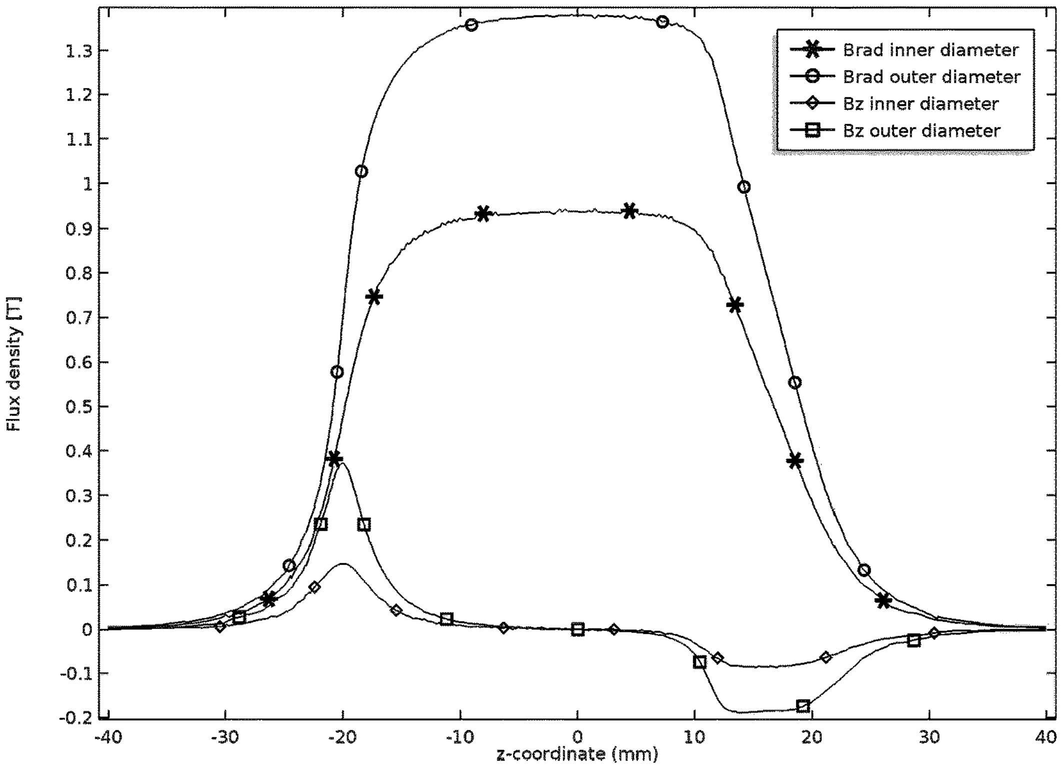
FIG. 6 shows the radial (B rad) and axial (Bz) flux density in different locations along the length of the passage of the magnetiser of FIG. 1 along the longitudinal lines defined by the points A and B as defined in FIGS. 3 and 4.

FIG. 6 shows the different components of the magnetic field at different longitudinal positions along the longitudinal axis of the passage. Two different paths are shown in the figure. The first path is a longitudinal line offset 2.5 mm from the longitudinal centre axis (point A in FIGS. 3 and 4) and the second path is a longitudinal line offset 3.7 mm (point B in FIGS. 3 and 4) from the longitudinal centre axis. One can imagine the figure is the result of the measurement of the magnetic field as one travels along the longitudinal line through the passage. The Z-coordinate shown on the x-axis in the figure is the position along the longitudinal centre axis. The position 0 mm is right in the middle of the passage. Likewise, the positions −40 and +40 are located outside the passage. As can be seen the Radial components (B rad) in the centre of the passage are very uniform and the z components (Bz) are very small. However, near the inlet and the outlet, the z-components of the magnetic field get quite large. On the left side of the figure (from around −30 to −10), the field is shown at the lower opening 12 of the passage and to the right in the figure (from around 10 to 30), the field is shown at the upper opening 10. As can be seen the z-component effects at the upper opening 10 are much reduced when compared to the z-component effects at the lower opening 12. At the upper opening, the z-component effect is less than 0.2 T at 3.7 mm from the centre while the z-component effect at the lower opening is around 0.4T. This means that the Z component effect is reduced by at least half by providing the diverging portion at the outlet of the passage.

It can be noted that should the reduction in z-component be required at both openings 10,12, then it would be possible to provide a diverging portion at both the lower and upper openings 10,12. For example if the object to be magnetised should be introduced via the upper opening and removed via the lower opening, then a diverging portion should be provided at the lower opening as well.

Figure 7:
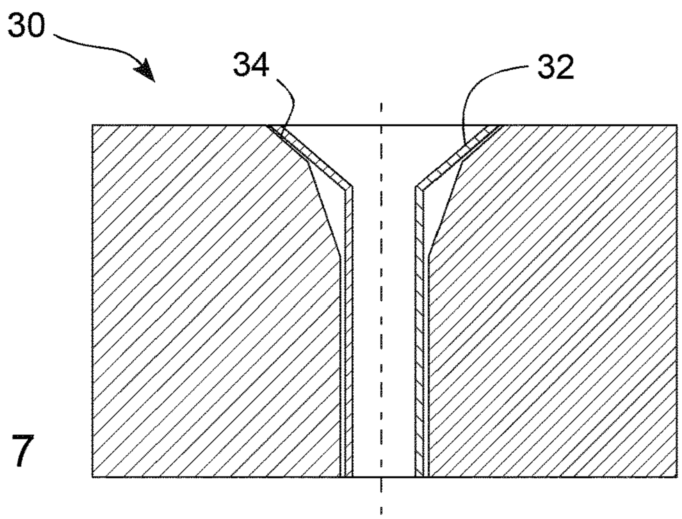
FIG. 7 schematically shows a cross sectional view of a second embodiment of a magnetiser according to the current invention.

FIG. 7 shows an embodiment 30, where a sleeve 32 has been provided to protect the magnet from damage. An extra angled portion 34 has been provided at the upper portion of the diverging portion. This extra angled portion allows a good seat of the sleeve. In this embodiment, it can be said that the average angle of the tangent vector of the diverging portion with respect to the longitudinal axis of the diverging portion is greater than in the embodiment of FIGS. 1 to 6, however one can see that the first portion is around 20 degrees and the second portion is around 40 degrees. Likewise, the angle of the normal vector to the surface of the first portion of the diverging portion is around 70 degrees and the angle of the normal vector to the surface of the second portion of the diverging portion is around 50 degrees. However, the change between uniform portion is 20 degrees and then a further change of 20 degrees is made. Hence the average rate of change of the angle of the diverging surface is not so large. In this embodiment, the sleeve is made from stainless steel so that the magnetic properties of the magnets are not affected so much. Other materials could also be used for the sleeve. In one case, the sleeve is made from a magnetically permeable material. This embodiment is constructed from a magnet assembly similar to the embodiment shown in FIGS. 1-6.

Figure 8:
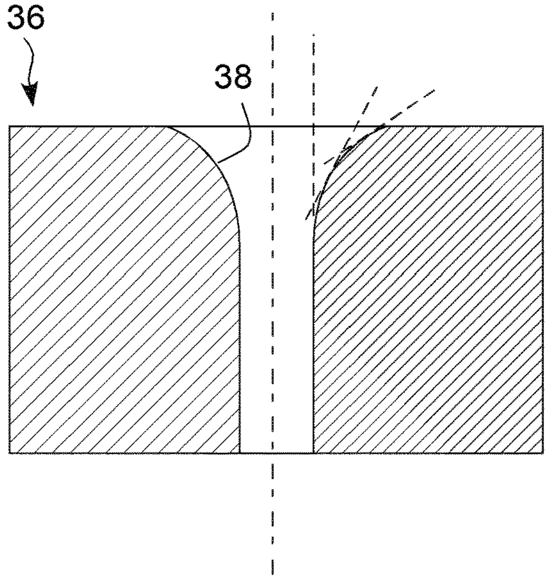
FIG. 8 shows a schematic cross sectional view of a third embodiment of a magnetiser according to the current invention.

FIG. 8 shows another embodiment 36 similar to the embodiment of FIGS. 1 to 6, but where instead of a diverging portion with a linear diverging surface, in this case, the diverging surface is a curved surface 38. In this case, the rate of change of the tangent angle along the surface is around 2 degrees per mm. However, it could be said that the average rate of change of the diverging surface could be less than 4 degrees per mm, less than 3 degrees per mm or less than 2 degrees per mm.

Figure 9:
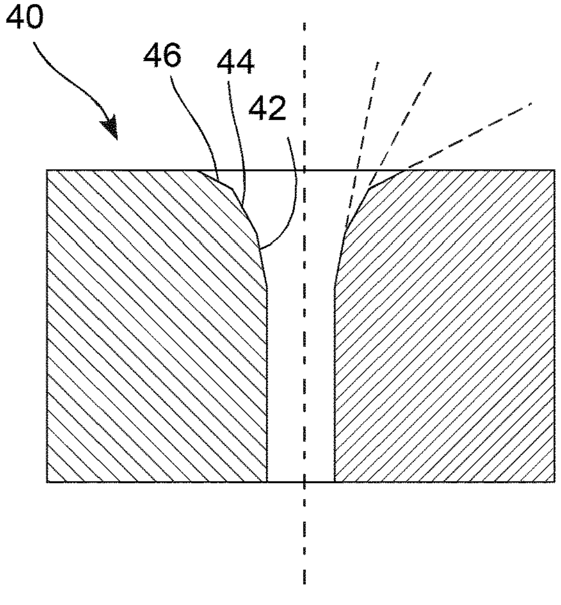
FIG. 9 shows a schematic cross sectional view of a fourth embodiment of a magnetiser according to the current invention.

FIG. 9 shows another embodiment 40 similar to the embodiment of FIGS. 1 to 6 but where instead of one linear diverging surface, the diverging surface comprises three individual portions 42, 44, 46 having different angles. The first diverging portion closest to the uniform portion has a tangent angle of approximately 11 degrees (normal vector around 79 degrees), the second portion has a tangent angle of approximately 29 degrees (normal vector around 61 degrees) and the last portion closest to the outlet has a tangent angle of approximately 62 degrees (normal vector around 28 degrees). However, the average angle of the tangent vector to the opposing surfaces of the diverging portion is (11+29+62)/3=34 degrees (average normal vector is (79+61+28)/3=56 degrees). If the different sections had different lengths, then the average calculation would be slightly different.

Figure 10:
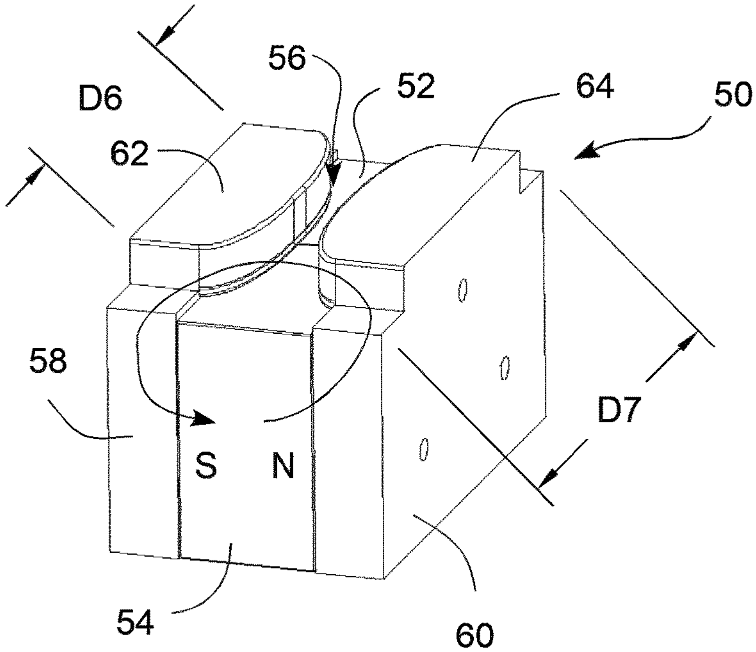
FIG. 10 shows a perspective view of a fifth embodiment of a magnetiser according to the current invention.
Figure 11:
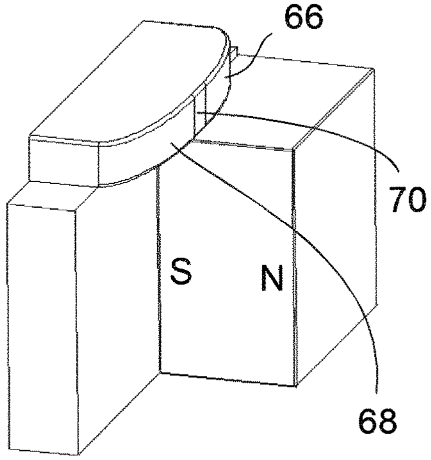
FIG. 11 shows a schematic perspective view of the magnetiser of FIG. 10 with one of the sides and one of the magnets hidden for clarity.

FIG. 10 shows an example embodiment 50 of a di-pole magnetiser. In this case, two permanent magnets 52, 54 are arranged on either side of a passage 56. A first and second magnetic conducting plate 58, 60 are arranged on either side of the magnets. The upper portion 62, 64 of the conducing plates are provided with a curved entrance 66 and exit 68 and a uniform central portion 70. A passage 56 is arranged between the curved surfaces. An object can be introduced into the passage at one end and moved through the passage to the other end to magnetize the object.

In this case, the passage 56 has two opposing parallel surfaces 66 and is open at the top and closed at the bottom. The magnetic field is arranged to pass essentially perpendicular through the passage from one opposing surface to the other at the central portion (uniform portion) 66 of the passage 56. Each end of the passage is formed as a diverging surface. Hence, the object to be magnetized can be inserted from either end and removed from either end. As such both entrances work as either inlet or outlet.

Figure 12:
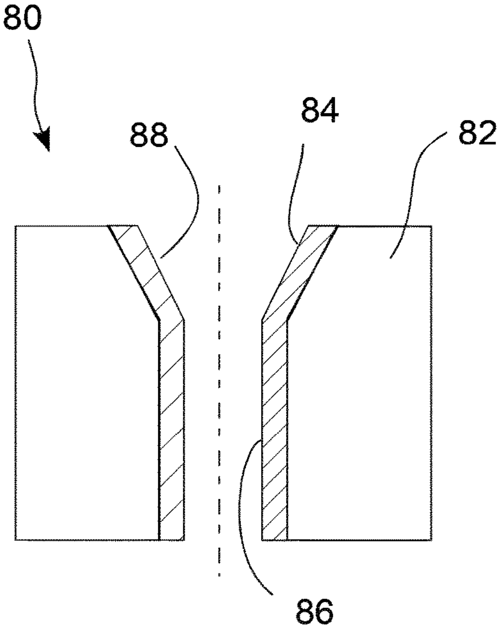
FIG. 12 shows a schematic cross sectional view of a sixth embodiment of a magnetiser according to the current invention.

FIG. 12 shows another embodiment 80, where a number of permanent magnets 82 are lined with a protective lining 84. The magnets however still have the uniform portion 86 defining the passage with parallel side walls and a diverging portion 88 with diverging opposing surfaces. The magnets are in this case arranged as a circular array as in the embodiment of FIGS. 1 to 6. Together, the magnets 82 and the protective lining 84 form a permanent magnetic assembly.

Figure 13:
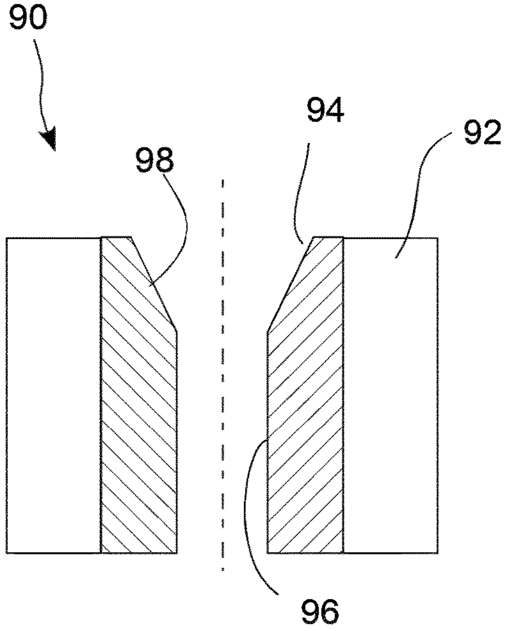
FIG. 13 shows a schematic cross sectional view of a seventh embodiment of a magnetiser according to the current invention.

FIG. 13 shows another embodiment 90, where the permanent magnets 92 are more rectangular in their cross section, but a core lining 94 made of a magnetic permeable material is provided with the inner uniform surfaces 96 and the diverging surfaces 98. As before the permanent magnets 92 and the core lining 94 together form a permanent magnet assembly.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing procedures have not been described in detail since it is maintained that the person skilled in the art would be able to find suitable materials and suitable processes to manufacture the magnetiser according to the current invention.

The invention claimed is:

1. A magnetiser comprising a housing, a passage arranged inside the housing, and a permanent magnet assembly arranged outside the passage to provide a magnetic field passing through the passage, said housing comprising an inlet to the passage and an outlet from the passage such that an object to be magnetised can be inserted into the passage via the inlet in the housing and removed via the outlet in the housing, wherein the passage includes:

a. a uniform portion where opposing surfaces of the permanent magnet assembly are arranged a uniform distance apart along the length of the uniform portion; and b. a diverging portion arranged between one end of the uniform portion of the passage and the outlet of the housing where opposing surfaces of the permanent magnet assembly diverge such that the distance between opposing surfaces of the diverging portion nearest the uniform portion is less than the distance between opposing surfaces of the diverging portion nearest the outlet;

c. wherein the average angle (B) of the normal vector of the opposing surfaces of the diverging portion to a longitudinal centre axis of the passage is greater than 45 degrees.

2. A magnetiser according to claim 1, wherein the permanent magnet assembly includes a permanent magnet arranged outside the passage and an insert arranged between the permanent magnet and the passage, said insert being made of a material having a relative magnetic permeability greater than 1.

3. A magnetiser according to claim 1, wherein the distance D3 between opposing surfaces of the uniform portion is fixed.

4. A magnetiser according to claim 1, wherein the distance D4 between opposing surfaces of the diverging portion nearest the outlet is at least 1.2 times greater than the distance D3 between the opposing surfaces of the uniform portion.

5. A magnetiser according to claim 1, wherein the length D2 of the diverging portion in a direction parallel to the longitudinal centre axis of the passage is greater than 0.5 times the distance D3 between the opposing surfaces of the uniform portion.

6. A magnetiser according to claim 1, wherein the inlet and the outlet in the housing are the same opening, such that the object to be magnetised is introduced into and removed from the passage via the same opening in the housing.

7. A magnetiser according to claim 1, wherein the inlet and the outlet in the housing are two different openings in the housing such that the object to be magnetised enters the passage via the inlet and leaves the passage via the outlet.

8. A magnetiser according to claim 1, wherein the permanent magnet assembly includes a circular array of magnets arranged around the periphery of the passage.

9. A magnetiser according to claim 8, wherein the circular array of magnets includes at least one permanent magnet which has a shape which is non rectangular.

10. A magnetiser according to claim 9, wherein the circular array of magnets includes at least one permanent magnet which is a non-planar surface.

11. A magnetiser according to claim 1, wherein the permanent magnet assembly includes an array of magnets arranged as a Halbach array.

12. A magnetiser according to claim 1, wherein the permanent magnet assembly is configured and arranged to provide at least a two-pole magnetic field in the uniform portion of the passage.

13. A magnetiser according to claim 1, wherein the permanent magnet assembly is configured and arranged to provide at least a four pole magnetic field in the uniform portion of the passage.

14. A magnetising mechanism comprising a magnetiser according to claim 1 and an actuator, said actuator being arranged to repeatedly move the magnetiser from a first position to a second position, said first position being arranged such that the passage is located away from an object to be magnetised and said second position being arranged such that the uniform portion of the passage of the magnetiser is arranged around the object to be magnetised.

15. A magnetising mechanism according to claim 14 wherein said actuator is configured and arranged to grip an object to be magnetised, move the object into the uniform portion of the passage in the magnetiser, remove the object from the passage in the magnetiser and release the object.

16. A magnetising mechanism according to claim 14, wherein the magnetising mechanism includes a centering mechanism, said centering mechanism being arranged to center an object to be magnetised with respect to the magnetiser, when said object is inserted into the magnetiser, said centring mechanism includes an exchangeable guide element which is removably inserted into the magnetiser, said exchangeable guide element being designed to contact the object to be magnetised and guide it into a centred position.

* * * * *